United States Patent
Thies

(10) Patent No.: US 10,916,941 B2
(45) Date of Patent: Feb. 9, 2021

(54) SUPPLY AND CONTROL UNIT FOR ELECTRICAL DEVICES OF A PRODUCTION SYSTEM AND METHOD THEREFORE

(71) Applicant: ONESUBSEA IP UK LIMITED, London (GB)

(72) Inventor: Reinhard Thies, Allersehl (DE)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 15/551,298

(22) PCT Filed: Feb. 19, 2015

(86) PCT No.: PCT/EP2015/000380
§ 371 (c)(1),
(2) Date: Aug. 16, 2017

(87) PCT Pub. No.: WO2016/131464
PCT Pub. Date: Aug. 25, 2016

(65) Prior Publication Data
US 2018/0041030 A1    Feb. 8, 2018

(51) Int. Cl.
*H02J 3/06* (2006.01)
*H02J 3/30* (2006.01)
*H01B 7/282* (2006.01)

(52) U.S. Cl.
CPC .............. *H02J 3/06* (2013.01); *H01B 7/282* (2013.01); *H02J 3/30* (2013.01); *Y02E 60/16* (2013.01)

(58) Field of Classification Search
CPC .... H01B 7/00; H01B 7/282; H02J 1/00; H02J 1/10; H02J 3/00; H02J 3/06; H02J 3/14;
(Continued)

(56) References Cited

U.S. PATENT DOCUMENTS

| 2005/0185349 A1 | 8/2005 | Biester et al. |
| 2007/0005195 A1* | 1/2007 | Pasquale ................... H02J 3/00 700/295 |

(Continued)

FOREIGN PATENT DOCUMENTS

| WO | 2010003469 A1 | 1/2010 |
| WO | 2011127422 A2 | 10/2011 |

OTHER PUBLICATIONS

Wikipedia, "Flywheel", https://en.wikipedia.org/wiki/Flywheel, Jul. 18, 2017; accessed Aug. 15, 2017, 7 pages.
(Continued)

*Primary Examiner* — Lincoln D Donovan
*Assistant Examiner* — Dave Mattison
(74) *Attorney, Agent, or Firm* — Helene Raybaud

(57) ABSTRACT

A supply and control unit for electrical devices (7, 8, 9) of a production system comprising at least one host power supply and control device (1) being connected via a power and data transfer cable equipment (2) with said electrical devices (7, 8, 9) comprising power supply input ports (4, 5, 6), and at least one control and actuating device (3) arranged in situ with said electrical devices (7, 8, 9) to control an operational mode of said electrical devices (7, 8, 9) by carrying out a control command received from the host device (1) characterized in that at least one additional power source device (10) is arranged in situ with the electrical devices (7, 8, 9) comprising at least one flywheel energy storage being charged during charging periods linked to control commands that the operational mode of at least one electrical device (7, 8, 9) is to be started and being discharged to increase the power supply at input ports (4, 5, 6) of the electrical devices (7, 8, 9) that are being switched into the operational mode.

14 Claims, 2 Drawing Sheets

(58) Field of Classification Search
CPC .... H02J 3/18; H02J 3/30; Y02E 60/00; Y02E 60/16
USPC .......................................................... 307/20
See application file for complete search history.

(56) References Cited

U.S. PATENT DOCUMENTS

2011/0247825 A1* 10/2011 Batho ................. E21B 41/0007
                                                      166/335
2013/0285446 A1    10/2013 Chow et al.

OTHER PUBLICATIONS

Wikipedia, "Flywheel energy storage", https://en.wikipedia.org/wiki/Flywheel_energy_storage, Aug. 14, 2017; accessed Aug. 15, 2017, 7 pages.
International Search Report and Written Opinion issued in International Patent Appl. No. PCT/EP2015/000380 dated Apr. 2, 2015; 11 pages.

* cited by examiner

SUPPLY AND CONTROL UNIT FOR ELECTRICAL DEVICES OF A PRODUCTION SYSTEM AND METHOD THEREFORE

CROSS REFERENCE TO RELATED APPLICATIONS

This application claims priority to PCT Patent Application No. PCT/EP2015/000380, filed on Feb. 19, 2015, which is incorporated herein by reference in its entirety.

The disclosure relates to a supply and control unit for electrical devices of a production system and a method for supplying and controlling electrical devices of a production system.

BACKGROUND

US 2005/0185349 A1 discloses a control and supply system for electrical devices. The control and supply system comprises at least one voltage supply and control device above sea level, a subsea cable connecting said voltage supply and control device with the electrical devices, and a control and actuating device which is associated essentially in situ with the electrical devices. The voltage supply and control device comprises at least one AC/DC converter for the production of a direct voltage for feeding into the subsea cable. The control an actuating device is associated with at least one DC/DC or DC/AC converter for converting the direct voltage transmitted by the subsea cable into a direct voltage or alternating voltage and the voltage generated thereby can be transmitted to the electrical devices.

WO 2011/127422 A2 teaches a system and method for power distribution, in particular for subsea use. The system comprises a surface host facility comprising a surface electrical power source, and a subsea power distribution hub operationally connected to the surface electrical power source to receive a high voltage input. The subsea power distribution hub includes a transformer to provide a medium voltage output and a low voltage output. An umbilical is provided which is adapted to operationally connect the subsea power distribution system to the surface host facility. The umbilical comprises an electrical conductor to transmit the high voltage input from the surface host facility to the subsea distribution hub.

In electric supply and control systems the electrical power requirements vary in a wide range. Most of the time the system is in a monitoring or idle mode with a low overall power consumption. On the other hand a high amount of power, compared to this mode, is needed for very short periods of time, when a production valve is to be opened, for example. Therefore the system might be designed for the maximum load which is needed to operate the largest actuator, which means the highest electric power consumption of the electric devices. Due to this fact the copper cross section of the main and infield umbilical needs to be designed that it can handle the worst case power consumption. This has a huge financial impact on the umbilical. It is getting even worse on longer step outs because of the drastic dynamic load variations which are to be taken into account, the umbilical size needs to be increased again compared to static load.

SUMMARY OF DISCLOSED EMBODIMENTS

In some embodiments of the present disclosure it is proposed a supply and control unit for electrical devices of a production system which comprises a host power supply and control device being connected via a power and data transfer cable equipment with power supply input ports of said electrical devices. The power supply and control unit comprises a control and actuating device which is arranged in situ with the electrical devices. The control and actuating device controls an operational mode of the electrical devices by carrying out a control command received from the host device. An additional power source device is arranged in situ with the electrical devices, which comprises a flywheel energy storage. The flywheel energy storage is charged during charging periods that are linked to control commands that the operational mode of at least one electrical device is to be started. The flywheel energy storage is discharged to increase the power supply at at least one input port of the electrical devices which are to be switched into the operational mode.

The proposed supply and control unit might adopt the flywheel energy storage technology for application in electric production systems. The flywheel energy storage might be used to smooth the overall system load. With a flywheel energy storage arranged in situ with the electrical devices to be controlled the flywheel energy storage might be charged/loaded before the operation of an electrical device is started. In addition the charging of the flywheel energy storage may be started smoothly, which means that drastic load variations might be avoided. Thereby component stress might be reduced and therefore the reliability of the power supply might be increased. Depending on the time that can be spent before an electrical device is to be switched into operation, there might be a huge saving factor in the costs for the cable equipment. This is due to the fact, that the maximum load on the cable equipment might be reduced, the longer the charging periods last. Thus, the cable might be designed for a smaller maximum load. Therefore the copper cross-section of the cable equipment might be reduced, which might result in cost savings for the cable equipment.

In some embodiments of the supply and control unit, the electrical devices of the production system are actuators, control valves, chokes and the like, to control the flow of fluids. Typically such an actuator will be fully opened or closed within 60-90 seconds. Once e.g. a fail safe close actuator is opened much less power is needed to hold it in position. An idle load of such electrical devices may be approximately 5% of the maximum required load in operational mode.

According to an embodiment of the present disclosure a method for supplying and controlling electrical devices of a production system is provided. The method uses a supply and control unit comprising at least one host power supply and control device, a power and data transfer cable equipment and at least one control and actuating device. The method includes operating an electrical device in a monitoring mode and an operational mode, wherein during at least the operational mode power is supplied from the host power and control device to the electrical device to be operated; switching between said modes by using a control and actuating device being arranged in situ with said electrical devices; generating and transmitting a control command from said host power and control device to initiate the operational mode of the electrical device and to charge a flywheel energy storage as an additional power source device being arranged in situ with the electrical devices in response to the received control command; starting actuation of an electrical device during operational mode when the flywheel energy storage is sufficiently charged to add power to the power supplied from the host power and control device; performing the operational mode during emptying of the flywheel energy storage.

According to an embodiment the flywheel energy storage adds 15% to 90%, in particular 60% to 85%, of power supply needed to operate an electrical device. According to an embodiment the control and actuating device switches into the monitoring mode, before the flywheel energy storage is being discharged. According to an embodiment the flywheel energy storage smoothens load variations.

BRIEF DESCRIPTION OF THE DRAWINGS

In the following additional embodiments of the present disclosure are explained in more detail with reference to the accompanying drawings. The drawings are not necessarily to scale. Certain features of the present disclosure may be shown exaggerated in scale or in somewhat schematic form and some details of conventional elements may not be shown in the interest of clarity and conciseness.

DETAILED DESCRIPTION OF THE DISCLOSED EMBODIMENTS

Figure 1:
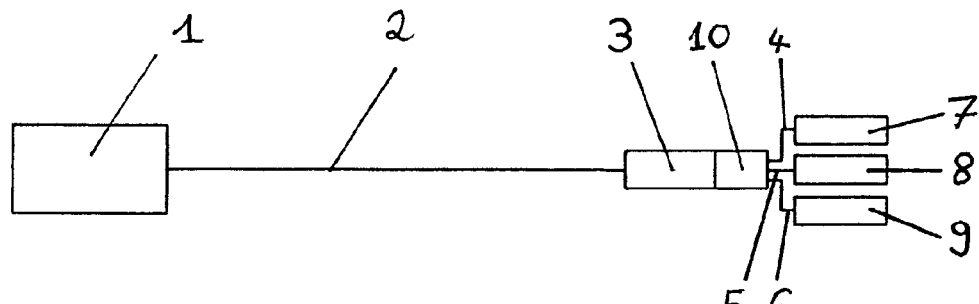
FIG. 1 is a schematic illustration of an embodiment of a supply and control unit for electrical devices of a production system according to one or more aspects of the present disclosure.

FIG. 1 shows schematically a supply and control unit for electrical devices 7, 8, 9 of a production system. The supply and control unit comprises a host power supply and control device 1 being connected via a power and data transfer cable equipment 2 with said electrical devices 7, 8, 9 which comprise power supply input ports 4, 5, 6. The supply and control unit further comprises a control and actuating device 3 which is arranged in situ with said electrical devices 7, 8, 9. The supply and control unit is provided to control an operational mode of said electrical devices 7, 8, 9 by carrying out a control command received from the host device 1. An additional power source device 10 is arranged in situ with the electrical devices 7, 8, 9 which comprises at least one flywheel energy storage. The flywheel energy storage is charged during charging periods that are linked to control commands that the operational mode of at least one electrical device 7, 8, 9 is to be started. The flywheel energy storage is discharged to increase the power supply at input ports of the electrical devices 7, 8, 9 that are being switched into the operational mode.

The supply and control unit may be used to supply and control a production system in the oil and gas industry. Such a production system may include production wells, a production gathering manifold, injection wells and processing units as production facility components (not shown). The production facility components may include a plurality of sensors and actuators as well as wellhead and/or subsurface valves. Therefore in a production system in the oil and gas industry the electrical devices 7, 8, 9 to be supplied and controlled by the supply and control unit can be actuators, control, valves, chokes and the like, which are used to control the flow of fluids. The supply and control unit is adapted to provide electrical power to multiple of such consumers within the limits of the production system.

To control the operation of the electrical devices 7, 8, 9 a host power supply and control device 1 is provided. The host device 1 is located at a surface location and may be located at an extended step-out distance from the production facility components. The host device 1 is connected to a control and actuating device 3 by a cable equipment 2 that bridges the step-out distance. The cable equipment 2 comprises at least a line for power transmission and a data line to transmit control commands from the host device 1 to the control and actuating device 3. The same or an additional data line may be used to transmit monitoring signals representing the state of the electrical devices or detection signals from sensors from the control and actuating device 3 to host device 1. In some embodiments all of these lines may be provided within a single umbilical cable including one or more conductors (e.g. wires, optic fibers) which is the cable equipment 2.

The control and actuating device 3 is provided to locally control the operation of a plurality of electrical devices 7, 8, 9 that are connected to the control and actuating device 3 via input ports 4, 5, 6. The control and actuating device 3 thus is a node in a network structure of the supply and control unit, that is able to communicate separately with each electrical device 7, 8, 9.

In the embodiment shown in FIG. 1 the additional power source device 10 is provided within the control and actuating device 3. The additional power source device 10 includes at least one flywheel energy storage to store electrical energy transmitted to the control and actuating device 3 in the form of rotational energy of a flywheel. The flywheel may be made of steel or of carbon-fiber composites, for example. To reduce friction, the flywheel may be suspended by magnetic bearings and/or suspended in a vacuum chamber.

In some embodiments the additional power source device 10 comprises a plurality of flywheel energy storages two or more of which are connected in parallel. Thereby the capacity of the additional power source 10 might be increased as to match the power requirements of the electrical devices 7, 8, 9. In an embodiment not shown the additional power source device is provided adjacent to the control and actuating device 3.

In some embodiments the additional power source device 10 comprises a charge detection device for issuing an enabling signal to the at least one control and actuating device 3 that the at least one flywheel energy storage is charged sufficiently for the operational mode of at least one electrical device 7, 8, 9. While the flywheel storage is being charged during charging periods, the charge detection device may monitor the state of charge of the at least one flywheel energy storage. When the state of charge exceed a threshold value an enabling signal is issued. The threshold value may be chosen according to the power requirements of the operational mode to be carried out. The threshold value may therefore depend in particular on the at least one electrical device to be controlled.

In some embodiments the host power supply and control device 1 is located at the water surface or on land for supplying and controlling subsea electrical devices 7, 8, 9 via a subsea cable equipment 2. When located at the water surface the host power supply and control device 1 may be arranged on a surface vessel or on an offshore rig, for example. The subsea electrical devices 7, 8, 9 can be actuators to control a subsea production system located at the seafloor, which might be an all electric subsea production system. The actuators are controlled by the at least one control and actuating device 3 which is an electric subsea control module (ESCM). The control and actuating device 3 may be connected to the subsea cable equipment 2 by a wet mate connector.

In some embodiments the electrical devices 7, 8, 9 may be electric components for controlling electrohydraulic equipment. For example such electric components may be actuators and/or instruments, e.g. for actuating and monitoring valves in an electro-hydraulically controlled system. The flywheel energy storage of the additional power source device 10 may then be used to extend an existing low power electro-hydraulically controlled system to supply more power for short periods either for instruments or actuators.

Figure 2:
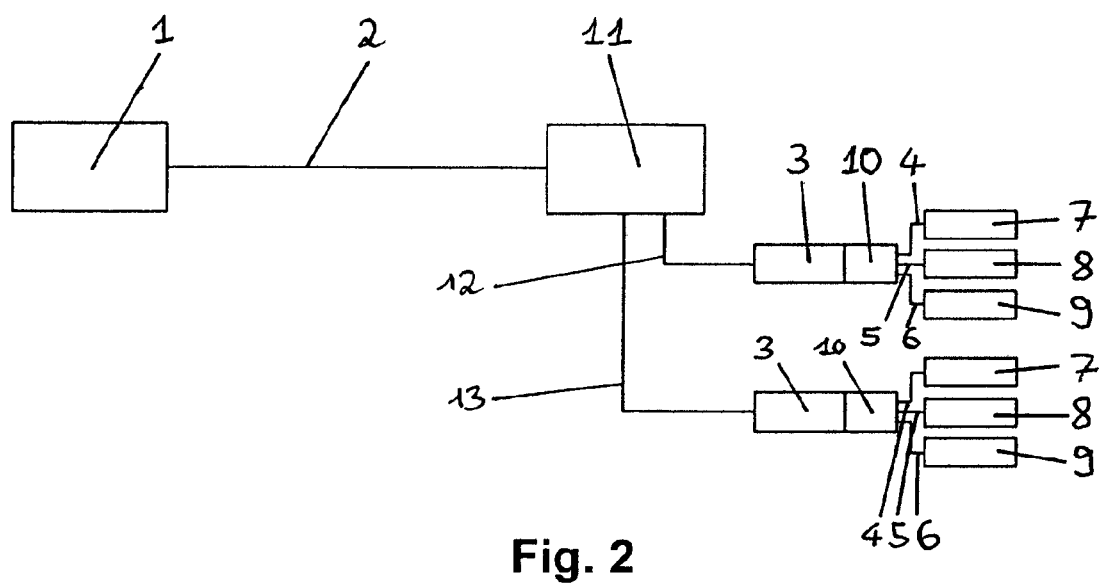
FIG. 2 is a schematic illustration of a second embodiment of a supply and control unit for electrical devices of a production system according to one or more aspects of the present disclosure.

In the second embodiment according to FIG. 2 the supply and control unit comprises in addition a distribution unit 11 to branch off separate cable lines 12, 13 from the cable equipment 2, wherein each cable line 12, 13 is connected to a control and actuating device 3. Thereby a plurality of control and actuating devices 3 can be controlled by a single host device 1 via the cable equipment 2. Moreover by means of the distribution unit 11 the supply and control unit is provided with a modular structure, wherein each control and actuating device 3 is a control module for controlling a plurality of neighboring electrical devices 7, 8, 9. The cable lines 12, 13 can be jumpers to connect the distribution unit 11 to a control and actuating devices 3, which include electrical conductors and/or data conductors. In the embodiment according to FIG. 2 an additional power source device 10 is arranged inside each control and actuating device 3. Therefore each control and actuating device 3 is coupled with at least one flywheel energy storage. Even in case of a failure of one additional power source device 10, the control and actuating devices 3 coupled to other additional power source devices 10 remain fully operational.

In other respects the description referring to the embodiment shown in FIG. 1 applies here accordingly.

Figure 3:
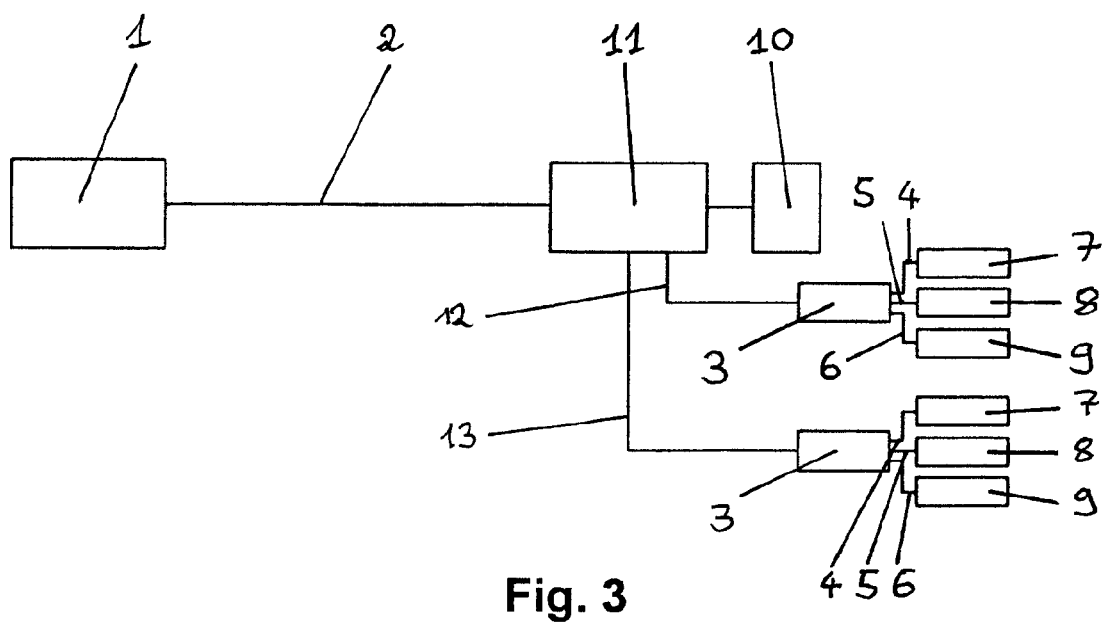
FIG. 3 is a schematic illustration of a third embodiment of a supply and control unit for electrical devices of a production system according to one or more aspects of the present disclosure.

FIG. 3 shows a third embodiment of the supply and control unit, comprising a distribution unit 11 as described with reference to FIG. 2. In contrast to the embodiment shown in FIG. 2 in the embodiment shown in FIG. 3 the additional power source device 10 is arranged adjacent to the distribution unit 11. The additional power source device 10 is connected to the distribution unit 11 and is thus charged and discharged via the distribution unit 11. When being discharged the additional power source device 10 provides additional electrical power via the distribution unit 11, separate cable lines 12, 13 and the control and actuating devices 3 to the input ports 4, 5, 6 of the electrical devices 7, 8, 9. In this embodiment the additional power source device 10 supplies electrical power to electrical devices 7, 8, 9 controlled by various control and actuating devices 3. With the additional power source device 10 being associated with the distribution unit 11 maintenance of the additional power source device 10, e.g. by using remotely operated vehicles, may be simplified due to its central position. Each control and actuating device 3 may be coupled with at least one flywheel energy storage. In another embodiment not shown, the additional power source device is arranged inside the distribution unit.

Depending on the layout and system availability it may be an option to use one flywheel energy storage inside or next to the distribution unit 11 (as shown in FIG. 3). As another option the flywheel energy storage could be installed inside or next to the control and actuating device 3 (as shown in FIG. 2). In either case the charge functionality may be optimized to operate the complete power system in a high efficient area to increase reliability and reduce system cost.

In the embodiments shown in FIGS. 1 to 3 the step-out distance between the host power supply and control device 1 and the at least one control and actuating device 3 may be 1 km to 300 km. Power converters (not shown) can be provided for transmitting converted AC or DC electrical power via the cable equipment 2. In order to transmit electrical power efficiently over the step-out distance, the voltage may be stepped up to a high voltage in the cable equipment 2. For this purpose a step up converter may be comprised in the host device 1 feeding a high voltage to the cable equipment 2. A step down converter may be comprised in the control and actuating device 3 in order to supply the electrical devices 7, 8, 9 at their required voltage level. The step down converter can also be provided in the distributing unit 11, such that the separate cable lines 12, 13 are operated safely at a stepped down voltage level. By using a high voltage of e.g. more than 22,000 VAC for transmission of power through the cable equipment 2 transmission losses and the cross-section of the cable equipment 2 might be reduced. Thus a more efficient transmission of power to the electrical devices might be achieved. For step-out distances of e.g. more than about 150 km a high-voltage direct current power transmission might be used. Moreover, due to the provision of the additional power supply device 10 with a flywheel energy storage the maximum power transmitted through cable equipment 2 might be reduced. Hence, power converters, in particular high voltage DC/DC converters, may be designed much smaller and more efficient because the operating power range might be reduced and the maximum load of these converters might be up to 5 times less. Therefore the flywheel energy storage might become a cost saving factor for converters.

The present proposal also relates to a method for supplying and controlling electrical devices of a production system that is described in the following with reference to FIG. 4.

The method uses a supply and control unit comprising at least one host power supply and control device, a power and data transfer cable equipment and at least one control and actuating device, the method comprising:

Operating an electrical device in a monitoring mode and an operational mode, wherein during at least the operational mode power is supplied from the host power and control device to the electrical device to be operated, Switching between said modes by using a control and actuating device being arranged in situ with said electrical devices, Generating and transmitting a control command from said host power and control device to initiate the operational mode of the electrical device and to charge a flywheel energy storage as an additional power source device being arranged in situ with the electrical devices in response to the received control command, Starting actuation of an electrical device during operational mode when the flywheel energy storage is sufficiently charged to add power to the power supplied from the host power and control device, Performing the operational mode during emptying of the flywheel energy storage.

In some embodiments of the method the flywheel energy storage adds 15% to 90%, in particular 60% to 85%, of power supply needed to operate an electrical device. In an embodiment the control and actuating device switches into the monitoring mode, before the flywheel energy storage is being discharged. In an embodiment the flywheel energy storage smoothens load variations.

Figure 4:
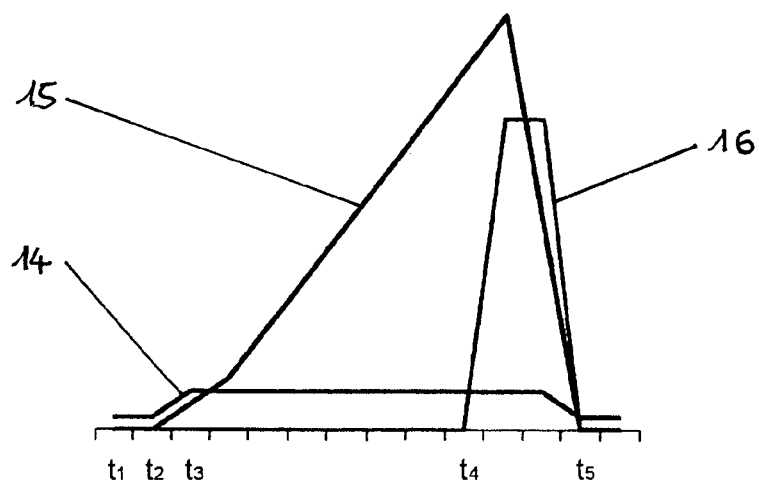
FIG. 4 shows an embodiment of a power flow for the flywheel energy storage during an operational mode in respect to the power flow supplied by the host power supply and control device and to actuator power flow depending on the time.

FIG. 4 shows a schematic diagram of a power flow for the flywheel energy storage during a typical valve/actuator operation. Diagram line 14 represents the supply power transmitted by the cable equipment. Diagram line 15 represents the amount of energy stored in the at least one flywheel storage of the additional power source device 10 and diagram line 16 represents the power consumed by the actuator. The percentages stated in the following are the overall power requirements compared to a conventional supply and control unit without a flying wheel storage installed.

At time $t_1$ the supply and control unit is in an idle mode with low power consumption (of e.g. 5%). At time $t_2$ the valve should be opened and therefore the system smoothly starts to charge the flying wheel energy storage. The power consumption slowly increases (e.g. from 5% to approximately 15%). From time $t_3$ to $t_4$ the flying wheel energy storage will be charged until the energy level exceeds the energy needed by the valve operation. Charging may be performed at a power consumption of approximately 15%, for example. Thus diagram line 15 increases from $t_3$ to $t_4$ while diagram line 14 is approximately constant. Time $t_4$ corresponds to the time at which the energy stored in the flying wheel energy storage is sufficient to operate the actuator for a requested period of time. Time $t_4$ may be determined by using a charge detection device of the additional energy source, which issues an enabling signal, when a required state of charge is reached. At time $t_4$ the valve will be opened with the energy stored in the flying wheel energy storage, while power consumption through the cable equipment is still approximately at 15%, for example. During valve operation the actuator power (diagram line 16) is drawn from the cable equipment 2 as well as from the additional power source device 10. When the actuator approaches its final position, i.e. before the valve operation is completed at time $t_5$, power consumption through the cable equipment 2 is slowly decreased. At time $t_5$ the valve operation is completed. The valve is open and the supply and control unit is in idle mode with low power consumption (of e.g. 5%).

The reduction in power consumption through cable equipment 2 may be performed such, that an idle mode power consumption is reached, at the time when the operational mode of the electrical devices 7, 8, 9 is terminated.

Alternatively, the reduction of power consumption through cable equipment 2 to idle mode power consumption may start and/or be completed after the operational mode of the electrical devices 7, 8, 9 has been terminated. In this case, excess power transferred through cable equipment 2 may be stored in the at least one flywheel energy storage.

During the operational mode of the valve, the maximal power consumption through the cable equipment 2 might therefore be reduced to approximately 15%, for example. Moreover, by the slow increase and decrease of the power consumption through the cable equipment at the beginning of the charging period and at the end of the operational mode, high dynamic load variations might be avoided.

Although the preceding description has been described herein with reference to particular means, materials and embodiments, it is not intended to be limited to the particulars disclosed herein; rather, it extends to all functionally equivalent structures, methods and uses, such as are within the scope of the appended claims.

The invention claimed is:

1. A supply and control unit for electrical devices of a subsea production system, the supply and control unit comprising:
a host power supply;
a host control device;
a power and data transfer cable configured to couple the host power supply and the host control device to the electrical devices;
a distribution unit coupled to the host power supply and to the power and data transfer cable, wherein the distribution unit is upstream from the electrical devices;
a local control and actuating device arranged in situ with the electrical devices and downstream from the distribution unit, the local control and actuating device is configured to control an operational mode of the electrical devices by carrying out a control command received from the host control device;
a local power source device arranged in situ with the electrical devices, the local power source device comprising at least one flywheel energy storage device that is configured to discharge power to increase a power supply to the electrical devices in the operational mode, and wherein the local power source device couples to and is upstream from the distribution unit and the local control and actuating device; and
wherein the local power source device further comprises a charge detection device configured to issue an enabling signal to the local control and actuating device in response to the flywheel energy storage device containing sufficient charge to operate at least one of the electrical devices.

2. The supply and control unit according to claim 1, wherein the electrical devices comprise actuators, control valves, and/or chokes.

3. The supply and control system according to claim 1, wherein the electrical devices are electric components for controlling electrohydraulic equipment.

4. The supply and control unit according to claim 1, wherein a step-out distance of 1 km to 300 km is between the host power supply and the host control device and the local control and actuating device.

5. The supply and control unit according to claim 1, wherein the host power supply and the host control device are located at a water surface or on land, wherein the electrical devices are located subsea, and wherein the host power supply and the host control device are configured to supply and control the electrical devices via a subsea cable.

6. The supply and control unit according to claim 1, wherein the local control and actuating device comprises a first control and actuating device and a second control and actuating device, and wherein the distribution unit is configured to distribute power to the first control and actuating device and the second control and actuating device.

7. The supply and control unit according to claim 1, wherein the local control and actuating device comprises a plurality of control and actuating devices.

8. The supply and control unit according to claim 1, wherein the local control and actuating device is coupled with the flywheel energy storage device.

9. The supply and control unit according to claim 1, wherein the local power source device comprises a plurality of flywheel energy storages devices.

10. A method for supplying and controlling an electrical device of a subsea production system, the method comprising:
generate a control command with a host control device;
transmit the control command to a local control and actuating device, wherein the local control and actuating device is configured to actuate the electrical device in response to the control command, and wherein the host control device and the local control and actuating device coupled together with a power and data transfer cable that transfers power from a host power supply and the control command from the host control device to the local control and actuating device;

provide power from the host power supply to a distribution unit and from the distribution unit to the electrical device to actuate the electrical device;

actuate a flywheel energy storage device to provide additional power to the electrical device, wherein the flywheel energy storage device provides power to the distribution unit and from the distribution unit to the electrical device, and wherein the flywheel energy storage device is upstream from the local control and actuating device and the distribution unit;

wherein a charge detection device issues an enabling signal to the local control and actuating device in response to the flywheel energy device storage containing sufficient charge to operate the electrical device.

11. The method according to claim 10, wherein the flywheel energy storage device adds 15% to 90% of a power supply needed to operate the electrical device.

12. The method according to claim 10, wherein the local control and actuating device switches from a monitoring mode to an operational mode in response to the control command.

13. The method according to claim 10, wherein the flywheel energy storage device reduces load variations.

14. The supply and control system according to claim 9, wherein the plurality of the flywheel energy storage devices are connected in parallel.

* * * * *